United States Patent [19]
Blum et al.

[11] 3,959,638
[45] May 25, 1976

[54] HIGHLY AVAILABLE COMPUTER SYSTEM

[75] Inventors: Arnold Blum, Pforzheim; Fritz Irro; Guenther Sonntag, both of Boeblingen, all of Germany

[73] Assignee: International Business Machines Corporation, Armonk, N.Y.

[22] Filed: Feb. 6, 1975

[21] Appl. No.: 547,672

[30] Foreign Application Priority Data
Feb. 15, 1974 Germany............................ 2407241

[52] U.S. Cl..................... 235/153 AK; 235/153 AE
[51] Int. Cl.² ................... G06F 11/00; G06F 15/16
[58] Field of Search ............... 235/153 AK, 153 AE; 340/172.5, 146.1 BE

[56] References Cited
UNITED STATES PATENTS

| | | | |
|---|---|---|---|
| 3,818,199 | 6/1974 | Grossman et al. | 235/153 AK |
| 3,557,315 | 1/1971 | Kobus et al. | 235/153 AK |
| 3,609,704 | 9/1971 | Schurter | 340/172.5 |
| 3,692,989 | 9/1972 | Kandiew | 235/153 AK |
| 3,758,761 | 9/1973 | Henrion | 235/153 AK |
| 3,787,816 | 1/1974 | Hauck et al. | 340/172.5 |
| 3,806,887 | 4/1974 | Schulte et al. | 340/172.5 |
| 3,838,261 | 9/1974 | Rice et al. | 235/153 AE |
| 3,872,291 | 3/1975 | Hunter | 235/153 AK |

OTHER PUBLICATIONS
Chao, The System Organization of MOBIDIC B, 1959, Proc. of the Eastern Joint Computer Conference, pp. 101–107.

*Primary Examiner*—Charles E. Atkinson
*Attorney, Agent, or Firm*—Roy R. Schlemmer

[57] ABSTRACT

For increasing the availability of a modular computer, a control unit and switches are provided, the latter being connected in between the control storages and the remaining identical hardware of the processor. In the case of a hardware error of one processor, its control storage is switched for a specific period of time to the same hardware of another processor which interrupts its own tasks, assuming the tasks of the defective processor for the time during which the control storage of the defective processor remains switched off. Subsequently, the former or non-defective processor resumes its own tasks. The task cycles assigned to one processor or the other can be specified to be identical or as a function of the respective processing requirements.

7 Claims, 4 Drawing Figures

HIGHLY AVAILABLE COMPUTER SYSTEM

BACKGROUND OF THE INVENTION

To ensure reliable results, electronic data processing systems comprise, without exception, error check circuits for monitoring the arithmetical and logical operations performed in them. The best known devices used to this end are parity check circuits which generate an additional or a parity bit on the basis of a fixed data length. This parity bit makes the number of bits within the fixed data length either even or odd. At the end of transfer sections, the parity bit is generally checked for changes.

Processing steps changing the source information necessitate that the parity bit be newly generated, the newly generated parity bit subsequently accompanies this information. Changes in the parity bit, on the other hand, indicate that an error has occurred which, depending upon its magnitude, may result in a machine stop.

Such machine stops reduce the availability of a digital computer system, thus affecting the execution of jobs in real time operation.

However, not all of the errors detected in a digital computer are attributable to defective circuits, the latter leading to permanent errors, but there are many other causes besides, such as the discharge of high static voltages that may lead to erroneous pulses on the transfer lines, so that, for example, a line which at the time of the occurrence of such a pulse should have carried a binary zero in the form of a low-level signal carries a high-level signal instead, which analogously would be equivalent to a binary one. In such a case the connected parity check circuit would detect an error with regard to the information transferred. In known data processing systems, the error would be eliminated by operation retries. In the case of intermittent errors, the digital computer is generally still capable of computing the correct result, so that the occurrence of such errors normally does not affect its availability.

However, when so-called permanent errors, i.e., errors caused by defective circuits or components, occur in a digital computer system, the correct result cannot be computed by retrying a faulty operation or function, so that the machine has to be stopped. In such cases the system remains at a standstill pending the exchange of the defective system components.

This, however, entails the disadvantage of valuable machine time being lost, which is particularly detrimental when urgent jobs have to be carried out. Thus, it can be said that permanent errors seriously affect the availability of the system.

As there are certain electronic data processing applications where interruptions have to be avoided at all costs, it has been previously proposed to provide a data processing system consisting of two synchronized data processing units performing the same functions on the input data and whereby each processing unit comprises a plurality of data sources corresponding to a plurality of data sources in another processing unit. The two data processing units of the system concerned are connected in such a manner that they automatically monitor each other, disconnecting the defective data processing unit from the system in the case of an error. Such a system ensures largely trouble-free operation and meets the reliability standards up-to-date data processing systems are expected to meet. However, from the cost standpoint such a completely redundant data processing system is highly uneconomical as it requires twice the number of units for handling its jobs.

It has also been proposed to connect a main processing system and an error processing system via buses, whereby the error processing system monitors the check circuits of the main processing system by means of an addressing arrangement, identifying the corresponding check circuit in the case of an error, taking over the source data from the registers and functional units that have contributed to the faulty operation, storing and computing the erroneous function in its processing system, and subsequently transferring the erroneous function, via a selectable transfer system, to a result register of the main processing system corresponding to that function, and finally starting the main processing system for the next functions by setting a switch.

Although from the cost standpoint such a system is altogether more favourable than the one previously described, it does not offer an optimal solution with regard to the cost and time factor involved, for each function and operation necessitate data transfers from the main processing system to the error processing system and vice versa.

SUMMARY AND OBJECTS

It has been discovered that a highly reliable and available computer system having a plurality of processors may be realized by providing a single error detecting a reconfiguration control unit which switches the control storage of a defective processor to a non-defective one for a number of processors, i.e., it can service a number of processors for control storage switching. This increases the reliability and reduces the cost and thus the number of the connected processors.

It has further been discovered that the speed loss which may be caused by such switching operations can be reduced by curtailing the number of program transfers between the control storages involved. The speed loss can be reduced further by dynamically adapting the cycle allocation to the conditions existing in each case and which are determined by performance meters, whereby it is significant from the standpoint of the invention whether these performance meters are circuit or program-oriented units.

It is a primary object of the present invention to provide a method and system configuration which ensures a high degree of availability in a modular electronic computer system and reduces to a minimum the time losses and cost involved in attaining such availability.

It is a further object to provide such a method and apparatus wherein a single control apparatus is capable of servicing a plurality of processors.

DESCRIPTION OF THE DISCLOSED EMBODIMENT

The objects of the present invention are accomplished by a highly available modular computer system comprising a plurality of individual processing elements each capable of autonomous operation and each including instruction processing units, storage means, an arithmetic/logic unit, error detection means for detecting erroneous operation of the processing element, bussing means capable of interconnecting the instruction, address and data input/output registers of each processing element with the storage means of each processor. Reconfiguration control means and switching means are provided which are selectively operable to interconnect said registers of one processor to the storage means of its own or another processor. The reconfiguration control means is operable in response to the detection of an error in the operation of one of the processors to connect the working registers of a non-deflective processor to the registers of the defective processor. Means are also provided for saving all of the status information of both processors prior to the switching operation. The invention thus serves, among other things, to improve the availability of an electronic data processing system, a part of which has become defective.

Figure 1:
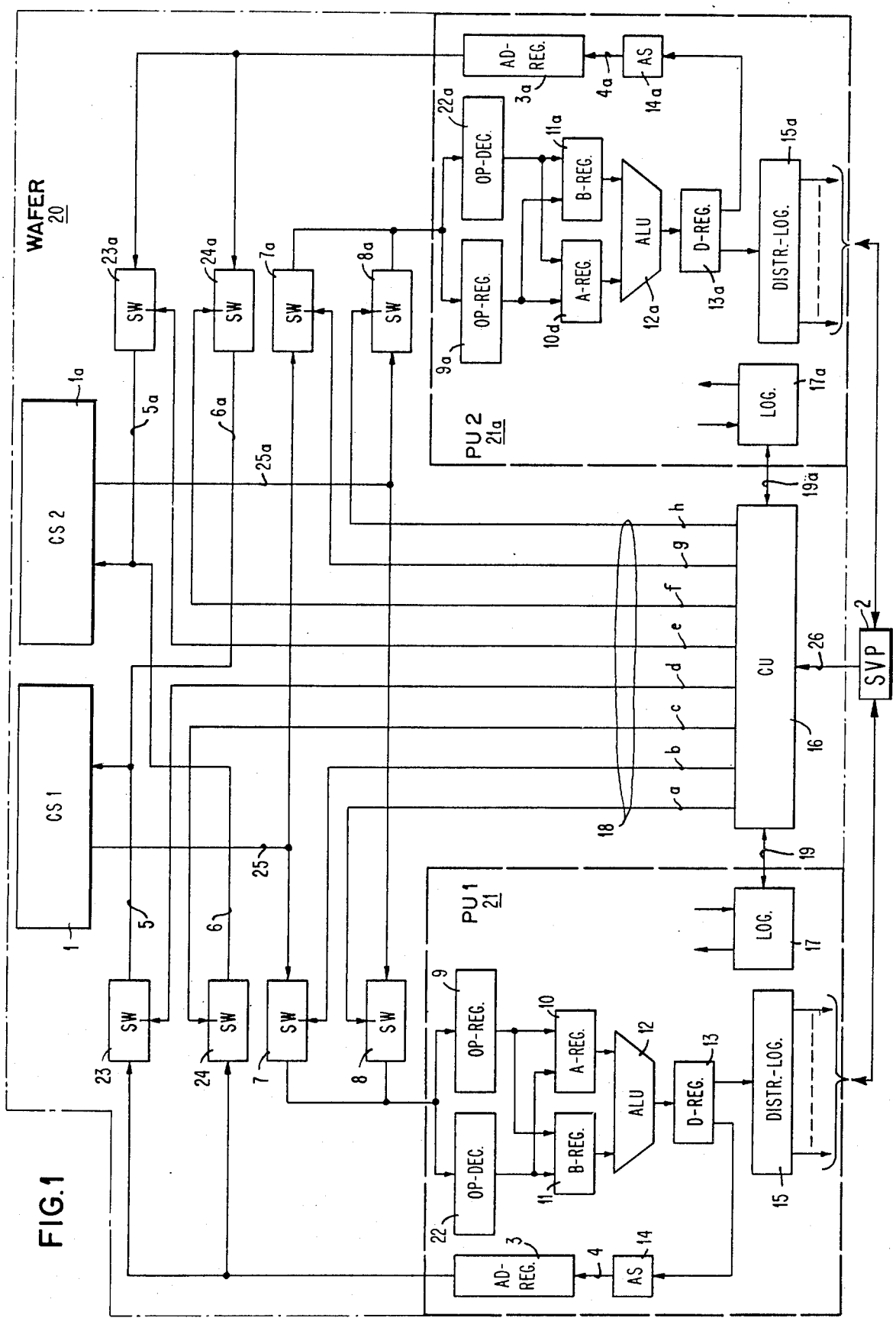
FIG. 1 is a block diagram of a circuit section of an electronic digital computer system using the switching arrangement in accordance with the invention.

Modular electronic data processing systems can consist of several processors (processing units PU1) of essentially the same circuit structure but whose control programs are adapted to different tasks. FIG. 1 shows a part of such an electronic data processing system which comprises, for example, processors (PU1) and (PU2) 21a arranged in high density integrated technology on wafer 20. Each processor is associated with a control storage of its own (CS1) 1 and (CS2) 1a which contains the respective processor control program. The different control programs stored in control storages 1 and 1a enable each processor to execute its specific tasks which form part of the overall range of tasks to be carried out by the electronic data processing system.

As is also shown in FIG. 1, each control storage 1 and 1a is associated with its own addressing circuits. These are the address registers (AD-REG) 3 and 3a and the address storages (AS) 14 and 14a which are connected via D register 13 and 13a, respectively. The latter together with the arithmetic and logical unit (ALU) 12 and 12a takes care of the accumulator functions. Communication with the control storages 1 and 1a is effected via operation registers (OP-REG) 9 and 9a which are also capable of assuming the function of a data register when the control storage contains not only instruction information but also data, such as constants, operands and the like. The respective output of operation register 9 and 9a is connected to the inputs of the A and B registers (A-B-REG) 10, 11 and 10a, 11a, respectively. The values (operands, addresses, index values) to be combined in arithmetic and logical unit (ALU) 12 or 12a can be temporarily stored in these two registers. The combination results are released via a further register (D-REG) 13 or 13a. Address values to be combined are temporarily stored, via register 13 or 13a, in an address storage (AS) or 14a. From the address values are fed to addressing circuits 3 or 3a for storage access operations.

Result values which are not addresses but essentially control data are transferred to circuits for the control of different functions. These circuits are arranged within processors 21 and 12a and are symbolically represented in the figure by blocks (DISTR-LOG) 15 and 15a and 17 and 17a, respectively.

Each storage 1 or 1a is connected, via a storage data but 25 or 25a to its processor 21 and 21a as well as to an address bus 5 and 5a, respectively. Instructions and data are read from a written into storage 1 via storage data bus 25 or 25a.

The internal operations of a processor are described below with reference to processor 21. The conditions of operation for processor 21a are analogous to those applicable to processor 21.

The particular storage location into which information is to be written or from which information is to be read are addressed via address bus 5 linking address register 3 to storage 1.

The typical structure of a processor and its appertaining storage 1 can be chosen at random. For the subsequent description it is assumed that all processors 21, 21a, 21b . . . 21c (21b . . . 21c not shown) have essentially the same structure.

As previously mentioned, a high degree of availability is an important criterion when planning the architecture of an electronic digital computer. The availability of the data processing system, a sectional view of which is shown in FIG. 1, is improved by extending the buses for storage communication, i.e., address bus 5 and storage data bus 25, by a bus of the same type, the functional unit concerned being connected to the respective processor. Thus address bus 5, for example, leads from address register 3 of processor 21, via a switch 23, to its own control storage 1, whereas address bus 6 from address register 3 of processor 21 is connected to control storage 1a of processor 21a via switch 24. Analogously, address bus 5a of processor 21a leads from its address register 3a to its control storage 1a. Address bus 6a, on the other hand, transfers the address information of processor 21a from address register 3a to control storage 1 of the other processor 21. The transmission paths for the address information are selected by means of switches 23, 23a, 24 and 24a which are actuated by a control unit (CU) 16 via control lines c, d, e and f.

Analogously, storage data buses 25 and 25a are each extended by a further bus. The information read from control storage 1 of processor 21 is fed via switch 7 to operation register 9 which can also be used as a storage data register. On the other hand, this information may be transferred via switch 7a to operation register 9a of the other processor 21a. The information read from storage 1a via storage data bus 25a can be transferred, with the aid of switches 8 and 8a, both to operation register 9a of the appertaining processor 21a and to operation register 9 of the other processor 21. Switches 7, 8, 7a and 8a are operated by control unit 16 via control lines a, b, g, and h.

In the case of component defects that cannot be removed by diagnostic or correction routines, this permits isolating the defective processor, e.g., 21a, from the remaining system and linking its control storage 1a to a non-defective processor, e.g., 21, which subsequently performs the functions of the isolated processor. This necessarily leads to a reduction in the processing speed of the system, since processor 21 has to keep its tasks in abeyance pending the performance of the tasks normally carried out by processor 21a.

In the simplest case of task sharing between processor 21 and processor 21a, the processing time assigned to the non-defective processor for processing its own tasks is equivalent to that for processing the tasks of the defective processor. However, the speed loss encountered with this mode of operation is higher than in a case where control unit 16, connected to the corresponding logic circuits of the two processors, determines the respective load conditions as a function of the program and the processor circuit structure and dynamically assigns a greater number of processing cycles to the processor with the higher processing requirements.

In the case of defects, the operating speed can be increased further by determining, for example, with the aid of diagnostic routines those erroneous functions of a processor which are attributable to irrevocable component defects and by having the functions concerned handled by the non-defective processor. To this end, control unit 16 is connected, via bus 26, to the diagnostic arrangement, not shown, of the data processing system.

This diagnostic arrangement may have a known structure enabling it to detect erroneous functions of the different processors. The diagnostic arrangement transfers to control unit 16 only an identification of the defective processor. Control unit 16 subsequently reshunts the data transmission paths in the busses mentioned. For the purposes of describing the present inventive concept, the particular error detection mechanism is not critical, it could be as simple as a parity check circuit.

Figure 2:
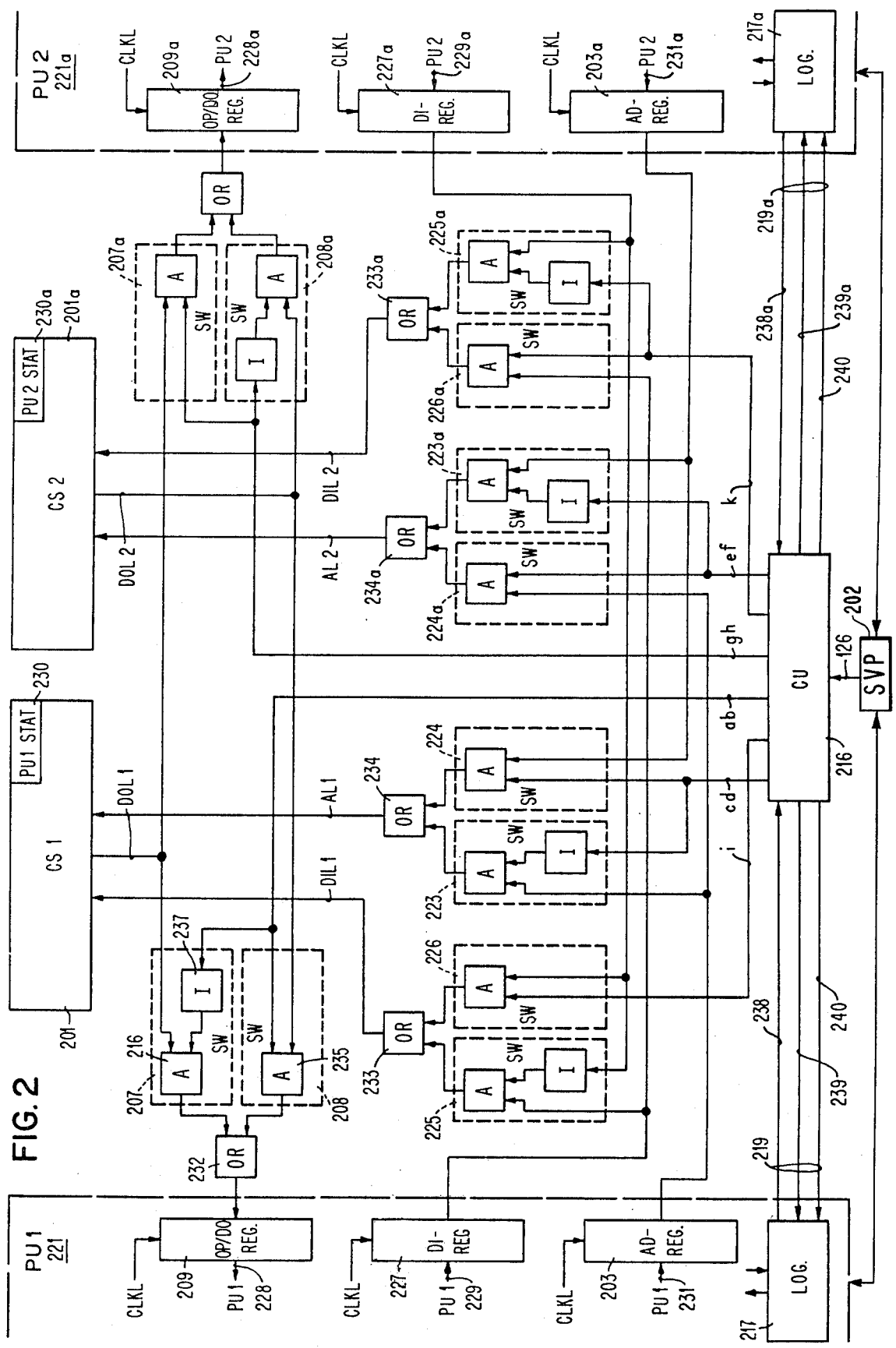
FIG. 2 is a detailed block diagram of the registers, transfer paths and switches used for switching.

An error detecting or gathering mechanism suitable for use herein is designated the SVP (Service Processor) 2 in FIG. 1. Such a unit and its operation is described in U.S. Pat. No. 3,786,430. The same unit is shown in FIGS. 2 (ref. 202) and 4 (ref. 420). As stated previously, the only information transferred to the control unit is an identification of which processor unit has an essentially hard failure.

This reduces the number of switching operations that are invariably necessary for data transmission and thus ensures a more favorable processing speed. By means of FIGS. 2 and 3 it will be described below how a processor is switched in the case of a defect. FIG. 2 shows in detail that part of the electronic data processing system of FIG. 1, which comprises the transmission paths between the storages of the different processors and their registers used for transmission. For example, storage 201 of processor (PUI) 221 receives its data via its data input line DIL 1. By means of switches 225 and 226 and OR gate 233 either the information made available in data input register (DI-REG) 227 of the appertaining processor 227 or the information of processor 221a which is stored in data input register 227a is transferred to data input line DIL 1.

Storage 201a of processor 221a receives its information via switches 225a and 226a as well as via OR gate 233a. These switches analogously determine whether the information contained in data input register 227a or that contained in data input register 227 of the other processor 221 is to be entered into storage. Information from the storages is read via data output lines DOL 1 or DOL 2 which are also designated as buses.

The storage output information is fed to the required registers 209 or 209a via data output line DOL 1 or DOL 2, via switches 207, 208, 207a, 208a, as well as via OR gates 232 or 232a. In FIG. 2 the registers concerned are the combined operation/data output register (OP/DO-REG) of the two processors 221 and 221a, respectively. Storage access or addressing is effected via address buses Al 1 or AL 2 on which the addresses from address registers (AD-REG) 203 or 203a are transferred. The direction of address transfer, i.e., the transfer of the addresses from the address register to the storage pertaining to one processor or to the storage of the other, in this case the defective processor, is determined via switches 223 or 223a, 224 or 224a as well as via OR gates 234 or 234a. As previously explained in connection with FIG. 1, said switches are controlled by control unit (CU) 216. Control unit 216 is linked to logic circuits 217 and 217a, respectively. These logic circuits belong to the two processors (PU1) 221 and (PU2) 221a which are symbolically represented on the left and right of FIG. 2, respectively.

FIG. 2 also shows control unit 216 which is connected to logic circuits (LOG) 217 or 217a of processor 221 or 221a via its lines 219 or 219a. Control line 219 consists of the line groups 238, 239 and 240. Control lines 219a have an analogous structure. Control unit 218 senses the respective check circuits of one processor via lines 238 and logic circuits 217. These check circuits emit an error signal when the system elements monitored by them carry erroneous information. By means of another set of information, as may be provided, for example, by an error diagnostic unit, it is determined whether the processor concerned is to be switched off in full or in part for specific functions. If control unit 216 decides that a processor is to be stopped, it generates a corresponding control signal on line 240. Switching of a processor is initiated by a signal on line 239 and performed via logic circuit 217 of processor 221.

By means of the timing diagram of FIG. 3 it will be described below how a defective processor is set off and how its control storage is switched to the non-defective processor.

A case will be described of normal operation during which processor 221 cooperates with control storage 201 and processor 221a cooperates with processor 201a to terminate the operation of processor 221 as a result of a machine error of processor 221 and of how, after several 100 nanoseconds have elapsed, processor 221a, which continues to be active, assumes the tasks of processor 221 following receipt of a signal which control unit 216 emits to the processors.

Figure 3:
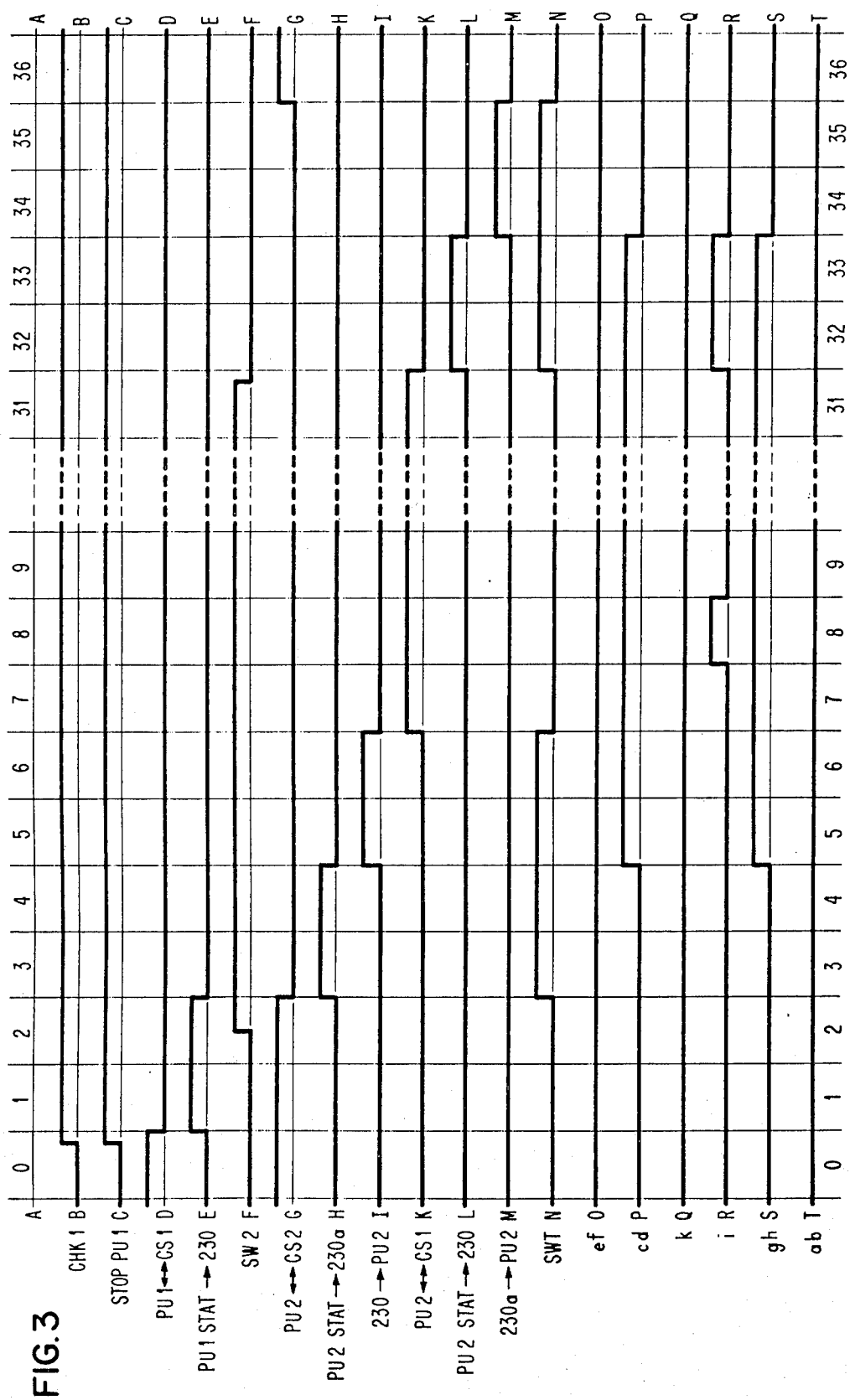
FIG. 3 is a pulse diagram explaining the operations of the switches and the control unit associated with the switches.

In FIG. 3 the machine cycles are marked by vertical lines, whereby line A indicates the number of the respective machine cycle. For the sake of simplicity it is assumed that the two processors operate synchronously. The two processors can also operate asynchronously. In the latter case several additional synchronization times are lost if following an error one processor has to be connected to two control storages.

It is assumed that at any one time in machine cycle 0 processor 221 emits an error signal CHK1 to control unit 216, as shown in line B of FIG. 3. This results in control unit 216 immediately emitting stop signal STOP PU1, as represented in line C of FIG. 3. The stop signal is transferred to logic circuits 217 of processor (PU1) 221 via line 240. In such a case, processor 221 immediately terminates its tasks, coming to a standstill at the end of machine cycle 0 (cf. line D in FIG. 3). The designation of the signal train indicates by way of mnemonics that processing of the program contained in control storage CS1 is stopped by processor PU1.

This is followed by two machine cycles in which the status information of the defective processor 221 is transferred to a fixed area 230 of its control storage 201. This status information takes the form of program addresses, condition codes, interrupts and test information and the like. As shown in FIG. 3, line E, the status information is transferred to the reserved area 230 of control storage 201 during machine cycles 1 and 2.

At one stage in machine cycle 2, error signal CHK 1 causes control unit 216 to emit signal SW2 required for initiating the switching operation. This signal shown in line F of FIG. 3, is transferred to logic circuits 217a of the non-defective processor 221a via line 239a and is taken as a request by the non-defective processor to terminate the execution of its tasks.

Signal SW2 as well as the control signals for actuating switches SW, representing the actual combinatorial switching logic of the data processing system, and which are transferred via control lines ab, cd, ef, gh, i and k are generated either in control unit 216 by the microprogram of said control unit or directly by means of control switching circuits belonging to said control unit.

As shown in line H of FIG. 3, the status information of the non-defective processor (PU2) 221a is saved into fixed storage area 230a (FIG. 2) of its appertaining control storage 201 in machine cycles 3 and 4.

This is followed in machine cycles 5 and 6, as shown in line I of FIG. 3, by the transfer of the status information of the defective processor from its fixed storage area 230 to the non-defective processor 1. Thus the status information of the defective processor is loaded into the non-defective one.

The saving of the status information of one processor and the transfer of the status information of the other processor, two operations performed during machine cycles 3 to 6 inclusive and 32 and 35 inclusive, are shown as switching time SWT in line N of FIG. 3. This switching time is required every time a processor is switched from one control storage to another.

Beginning with machine cycle 7, the non-defective processor, as shown in line K of FIG. 3, assumes the tasks of the defective processor. In the present example the non-defective processor handles the tasks of the defective one until the beginning of machine cycle 32.

Lines P and S, (FIG. 3), shows that as machine cycle 5 begins, the switch control signal on lines cd and gh is activated. Switch control signal cd opens switch 224, so that the address information stored in address register 203a is transferred to control storage 201 of the defective processor for accessing said storage. In this manner the status information of the defective processor can be read from the fixed storage area 230 and be loaded into the non-defective processor which in the assumed example is processor 221a. This necessitates, however, that logic circuit 217a condition the non-defective processor so that the initial or start address of the fixed area 230 in the control storage of the defective processor is loaded into address register 203a of the non-defective processor. To this end there are several conceivable solutions, one being, for example, that address register 203 which was previously set to 0 addresses the first storage location of the fixeT area by means of this zero value. Automatic incrementating of this address value after each access permits the whole of the fixed storage area to be read.

The switch control signal on line gh which at the beginning of the machine cycle 5 together with the switch control signal on line cd synchronously jumps to its upper level value opens switch 207a, so that the information read from storage 201 can be transferred on data output bus DOL 1 to the combined operation/data output register 209a of the non-defective processor 221a. Thus the status information of the defective processor is initially taken over by the non-defective one, so that the latter can assume the tasks of the defective processor at the point where the interruption occurred. The non-defective processor is capable of doing this as machine cycle 7 begins.

In line R of FIG. 3 it is shown in machine cycle 8 that the non-defective processor can also transfer data into the control storage of the defective processor. This transfer is made possible by a switch control signal carried on line i and, by means of which, switch 226 is opened. Thus information contained in data input register 227a can be entered into control storage 201 of the defective processor via the switch mentioned and data input line DIL 1.

For data processing, these are the essential transfer paths between the control storage of the defective processor and the corresponding register of the non-defective processor.

Switch control signals ef and ab, lines 0 and T of FIG. 3, assume their low level value, n the example described, so that they operate the corresponding switches provided with an inverter. In FIG. 2 the two types of switches 207 and 208 are shown in detail. Switch 207 consists of an AND gate 236 with two inputs. One input is directly connected to data output line DOL 1 of control storage 201, whereas the other input is linked with switch control line ab via inverter (I) 237. Switch 208, however, comprises only one AND gate 235, one input of which is connected to data output line DOL 2 of control storage 201a and the other input of which is connected to control line ab. The outputs of said AND gates 235 and 236 are combined via an OR gate 232, in which output is directly linked to the input of the combined operation/data output register 209.

Similar to the remaining switches 223, 223a, 224, 224a, 225, 225a, 226 and 226a, switches 207a and 208a have an analagous structure. In this case, also the outputs of the corresponding AND gates are combined via OR gates 232a, 234, 234a, 233 and 233a in which outputs are linked to the corresponding inputs of the registers and storages.

Time control of the information exchange in the different registers is effected by means of clocks which are transmitted to the registers via clock lines CLKL. Whereas, as shown in FIG. 2, combined registers 209 and 209a transmit information into their own processor via their output lines 228 or 228a, registers 227 and 227a transmit information from their own processor into storage via input line 229 and 229a, respectively.

Registers 203 and 203a, which receive addresses, from the address storage (cf. 14 in FIG. 1) of their own processor via lines 231 or 231a, serve to transfer these addresses to the control storages.

By means of the previously mentioned control signal, the transfer paths, the switch elements, the storages and the registers, a processor is capable of assuming the tasks of the other processor on a time sharing basis.

For the operation example previously described it had been assumed that processor 221a handles the tasks of the defective processor 221 by means of the saved status information beginning with machine cycle 7. As shown in FIG. 3, processor 221a handles the tasks of processor 221 until the end of machine cycle 31.

Line F of the pulse diagram, (FIG. 3), shows that the switching signal SW2 drops to its zero level shortly before the end of machine cycle 32, thus terminating the communication between processor (PU2) 221a and control storage (CS1) 201. In the succeeding machine cycles 32 until the end of cycle 33, the status information of processor 221a is saved in the fixed area 230 of control storage 201. From machine cycle 34 onward until the end of cycle 35, the status information is loaded from the fixed storage area 230a into processor 221a. The status information read at this stage from the fixed area 230a is the information which processor 221a received at the time of interruption on the points specific for the resumption of operation. Subsequently, the processor can resume its interrupted tasks, starting with machine cycle 36, as shown in line G of FIG. 3.

When the next interruption occurs, the work cycles described are repeated, with processor 221, as the non-defective processor, assuming the tasks of the defective processor 221a.

Figure 4:
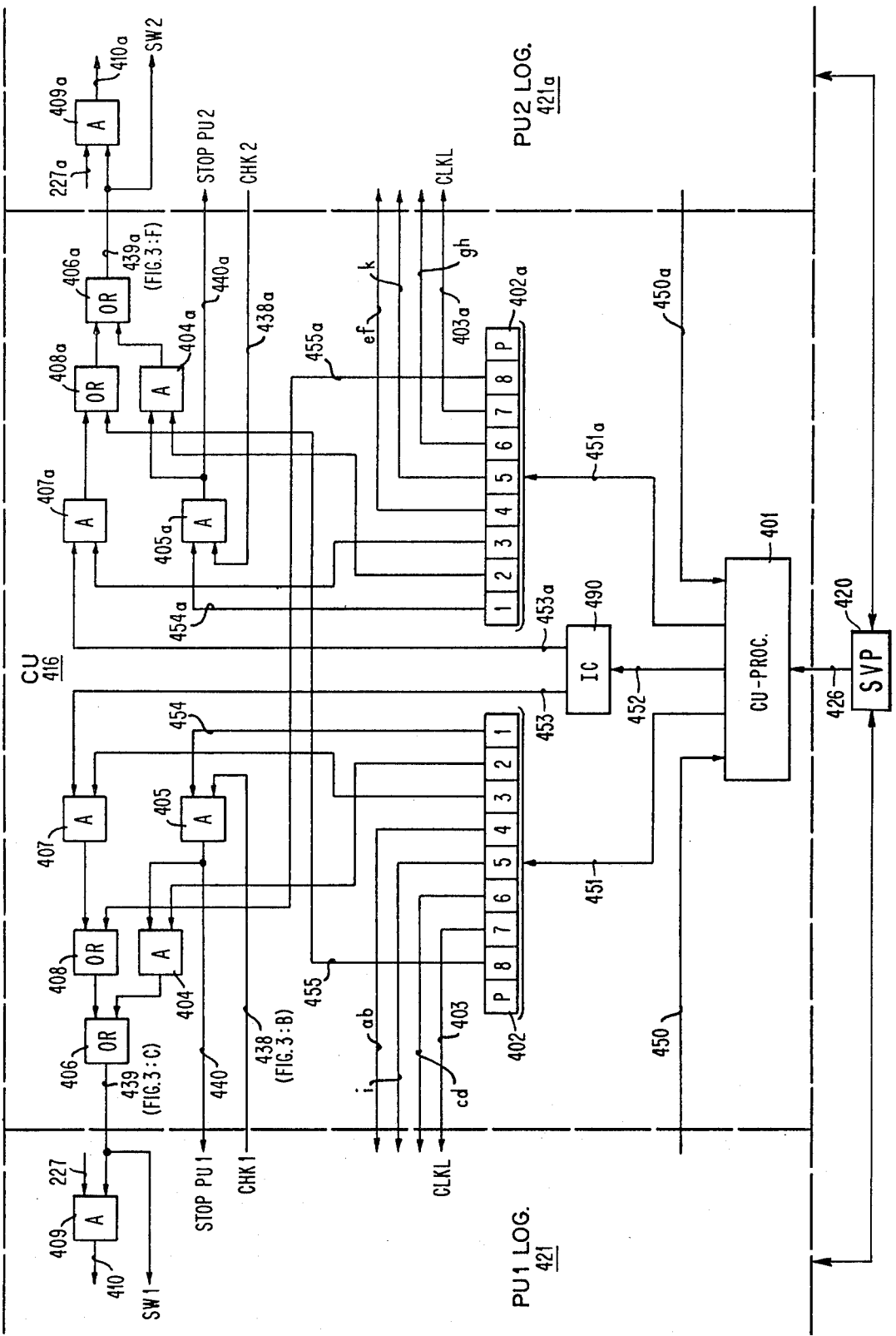
FIG. 4 is a detailed block diagram of the control unit used for switching.

FIG. 4 is a detailed representation of the essential system elements of control unit 16, FIG. 1, and control unit 216, FIG. 2. The central system element of this control unit is a processor (CU-PROC) 401 which structure may be similar to that of processors 21 or 21a in FIG. 1 and which comprises a control storage of its own similar to control storage 1 and 1a, respectively. This processor 401 is connected to specific units of the digital computer system via line 426, such as the processor for error checking and diagnosis and a measuring device determining the processing requirements of a few essential or of all processors (modules) as a function of the tasks to be carried out by them. If a processor drops out as the result of an irreparable defect, these processing requirements govern the distribution of the processing cycles between the defective and the non-defective processor which assumes the tasks of the defective one. As previously mentioned, fixed cycle distribution is equally practicable.

For the distribution of the processing cycles between the two processors an instruction counter (IC) 490 is provided. This instruction counter counts the number of instructions processed by a processor, initiating a switching step after a predetermined number has been reached, so that the tasks of the other processor can be processed for a predetermined number of instructions. As shown in FIG. 4, instruction counter 490 is incremented by processor 401 and is reset after a predetermined value has been reached. Information on the number of processed instructions is fed to processor 401 from processor 421 via control line 450 and from processor 421 via line 450a. This information is processed by the processor and transferred to instruction counter 490 via line 452. Instruction counter 490 has two outputs 453 and 453a which are respectively connected to one input of AND gate 407 and 407a, influencing the signal, line F, FIG. 3, which is activated for switching. Details on this will be described subsequently.

The actual operation cycle in control unit 416 is determined by registers 402 or 402a being loaded with a word resembling a micro instruction via lines 451 or 451a at a clock cycle predetermined by processor 401. This word comprises bits 1 to 8 and a parity bit P. Bit position 1 contains a binary 1 if, during the time for which the control word contained in register 402 or 402a assumes control, the operation of the appertaining processor 421 or 421a may be interrupted. This means that during the processing of an instruction, a point has been reached at which the corresponding processor may be interrupted. If the bit concerned is a 0, this indicates that during the storage of the control word in register 402 or 402a, such a point of interruption has not yet been reached for a specific instruction processed in the appertaining processor. The output of bit position 1 is connected to one input and AND gate 405 or 405a via lines 454 or 454a. The other input is linked to line 438 or 438a on which output signal CHK1 or CHK2 of all the check circuits of the connected processor is transferred to said AND gate. The output signal of this AND gate is transferred on line 440 for processor 421 (this applies in analogy to processor 421a). The signal concerned is shown in FIG. 3, line C. As is also shown in FIG. 3, the said signal is also transferred to one input of AND gate 404 which other input is linked to bit position 2 of register 402.

Bit position 3 of register 402 always contains a binary 1 when the work or processing cycles are to be distributed as a function of measured values. This necessitates, however, that the output of instruction counter 490 emits a signal to AND gate 407 via line 453. This output signal is generated when counter 490 has reached a predetermined value. Since line 452 is used both to carry values for incrementing and presetting the counter, dynamic cycle distribution is possible by predetermined values suiting the respective conditions being transferred to counter 490 for presetting.

The AND condition for gate 407 is fulfilled when counter 490 has reached a predetermined value and measuring mode operation is possible following the entry of a binary 1 into bit position 3 of register 402. The output signal of AND gate 407 is transmitted via one input of OR gate 408 to one input of a further OR gate 406, which output signal eventually generates the resetting signal which is transferred to the corresponding processor 421 via line 439.

The control signals for actuating switches 207, 208, 223, 224, 225 and 226 are stored in bit positions 4, 5 and 6 of control word register 402. These signals are transferred via lines ab, i and cd. The control signals for actuating the remaining switches in FIG. 2 are stored in the identically designated bit positions of register 402a.

For generating the control clock, the bit stored in position 7 is transferred to the connected processor via clock line 403 in the sequence of which control word register 402 is loaded. With each new word loaded into register 402 a pulse is derived from stage 7. The width of the pulse is equal to the time the binary 1 is stored in register stage 7. The pulse sequence corresponds to the clock at which register 402 is loaded with a new control word from processor 401. Thus it is very simple and straightforward to design a time clock which controls the switching operations of the control storages in the different processors.

For example, a control word in register 208, can directly initiate the necessary switching operations by means of the bit in position 8. Thus, for example, the transmission of a 1-bit from position 8 of register 402 to OR gate 408a via lines 455 and OR gate 406a cause a signal to be generated for activating the switching process SW2, as previously described in detail in connection with FIG. 3. The 1-bit in position 8 of register 402a initiates a switching process via line 455a and OR gates 408 and 406 as the generation of signal SW1 which is transferred, via line 439, to processor 421 where it initiates the switching processes. As previously mentioned, stage P contains the parity bit of the control word.

Finally, it is shown in FIG. 4 that the contents of the status register for processor 421 are also available on AND gate 409 through line 410. The status register containing the status information may be a part of the check and diagnostic processor which is generally contained once in each computer. This processor updates the status information of said register.

The status information made available via AND gate 409 and line 410 is transferred by the signal activating the switching process SW1 and transferred to data input register 227 via line 229 shown in FIG. 2. From the data input register the status information is subsequently transferred to the fixed area 230 of control storage 201.

Analogous conditions exist with regard to processor 421a which status information is entered into the fixed area 230a of control storage 201a via data input register 227a.

From the foregoing description it will be obvious that many changes in the form and detail of the switching and control circuitry can be made without departing from the spirit and scope of the present invention. Many of the sequences of operation may be interchanged depending on design considerations. The significant contribution of the present invention to the computer art is that once a hard failure is discovered in one processor of such a modular computing system, operations in that processor may be terminated and picked up by the still functioning processors. Bussing and control circuits are provided to allow direct access to the defective processor's storage for purposes of picking up all status information, instructions, data, etc., that is required for the performance of the task currently in progress on the defective processor.

What is claimed is:

1. In a modular computer system including a plurality of individual processors, each having essentially the same structure and functional characteristics but capable of operating under different control programs, wherein each processor has its own instruction processing means, an arithmetic logic unit, storage means, and necessary address and data 1/0 registers the improvement which comprises error detecting means for indicating that any processor has a hard failure and means for transmitting a failure signal to a control means, bussing means including gating operable under control of said control means for selectively interconnecting the address and data registers of the storage means of each processor so that any processor may be functionally substituted for the storage means of its own or any other processor in the system;

control means operative in response to a failure indicating signal from said error detection means to stop operation of the defective processor, interrupt the operation of a predetermined one of the nondefective processors and reconfigure said bussing means to connect the storage means of the defective processor to said predetermined non-defective processor and concurrently disconnect the storage means of the predetermined nondefective processor from said processor.

2. A modular computer system as set forth in claim 1, including means for continually updating the status data for tasks in process in each processor and means for transferring said status data from the storage means of said defective processor to said predetermined non-defective processor, whereby the task being performed by the defective processor can be picked-up by the non-defective processor at substantially the point at which the failure occurred.

3. A modular computing system as set forth in claim 2, wherein a fixed number of cycles are assigned to the nondefective processor for processing its own tasks and those of the other processor, and means for alternately connecting the defective processor's storage and the non-defective processor's storage to the non-defective processor.

4. A modular computing system as set forth in claim 3, including instruction counting means in said control means for determining a predetermined number of processing cycles, wherein the number of instructions executed are counted and compared with said predetermined number, means responsive to said counting means for switching storage after the predetermined number has been reached, means for resetting the instruction counter to 0 and for subsequently requesting it to count the instructions executed by the processor on the other task.

5. A modular computing system as set forth in claim 1, wherein said selectively operable bussing means includes individual address and data buses connecting the address and data registers of all the processors of the system to said busses through controllable gate circuits which are actuated by said control unit, the principal inputs to said control unit being "defective processor" information received from said error detection circuitry and "available processor" information indicating a processor which has the lowest task queue.

6. A modular computing system as set forth in claim 5, wherein said control unit includes a central processor, and two control registers for accommodating a control word, logic circuits connected to said control registers selectively actuable in accordance with the bit settings of said control word said logic circuits being operable to control the buss gating circuits to connect a given processor store to a selected processor over said bussing means and for selectively disconnecting a predetermined store from said bussing means.

7. A modular computing system as set forth in claim 6, wherein said control unit further includes a loadable counter and means for monitoring the contents thereof to control the distribution of work cycles of the non-defective processor during the processing of the tasks of both the non-defective and defective processor.

* * * * *